US010846591B2

(12) United States Patent
Lavigueur et al.

(10) Patent No.: US 10,846,591 B2
(45) Date of Patent: Nov. 24, 2020

(54) CONFIGURABLE AND PROGRAMMABLE MULTI-CORE ARCHITECTURE WITH A SPECIALIZED INSTRUCTION SET FOR EMBEDDED APPLICATION BASED ON NEURAL NETWORKS

(71) Applicant: Synopsys, Inc., Mountain View, CA (US)

(72) Inventors: Bruno Lavigueur, Ottawa (CA); Olivier Benny, Ottawa (CA); Michel Langevin, Ottawa (CA); Vincent Gagné, Gatineau (CA)

(73) Assignee: Synopsys, Inc., Mountain View, CA (US)

( * ) Notice: Subject to any disclaimer, the term of this patent is extended or adjusted under 35 U.S.C. 154(b) by 998 days.

(21) Appl. No.: 15/392,958

(22) Filed: Dec. 28, 2016

(65) Prior Publication Data

US 2017/0236053 A1    Aug. 17, 2017

Related U.S. Application Data

(60) Provisional application No. 62/272,252, filed on Dec. 29, 2015.

(51) Int. Cl.
*G06N 3/063*       (2006.01)
*G06N 3/04*        (2006.01)

(52) U.S. Cl.
CPC ........... *G06N 3/063* (2013.01); *G06N 3/0454* (2013.01)

(58) Field of Classification Search
CPC .................................................... G06N 3/063
See application file for complete search history.

(56) References Cited

U.S. PATENT DOCUMENTS

| 6,307,852 B1* | 10/2001 | Fisher | H04Q 3/68 340/2.2 |
| 7,009,964 B2* | 3/2006 | Fisher | H04Q 3/68 370/357 |
| 7,965,725 B2* | 6/2011 | Langevin | H04L 49/15 370/405 |

(Continued)

OTHER PUBLICATIONS

Du, Z., et al., "ShiDianNao: Shifting Vision Processing Closer to the Sensor",2015, ISCA '15 Proceedings of the 42nd Annual International Symposium on Computer Architecture, Portland, Oregon, USA, Jun. 13-17, 2015, pp. 92-104 (Year: 2015).*

(Continued)

*Primary Examiner* — Michael B Holmes
(74) *Attorney, Agent, or Firm* — Jaquez Land Greenhaus LLP; Bruce W. Greenhaus, Esq.

(57) ABSTRACT

A programmable architecture specialized for convolutional neural networks (CNNs) processing such that different applications of CNNs may be supported by the presently disclosed method and apparatus by reprogramming the processing elements therein. The architecture may include an optimized architecture that provides a low-area or footprint and low-power solution desired for embedded applications while still providing the computational capabilities required for CNN applications that may be computationally intensive, requiring a huge number of convolution operations per second to process inputs such as video streams in real time.

21 Claims, 7 Drawing Sheets source    destination

1 NN layer (56) References Cited

U.S. PATENT DOCUMENTS

| | | | | |
|---|---|---|---|---|
| 8,135,851 | B2* | 3/2012 | Pilkington | G06F 9/465 709/229 |
| 9,250,908 | B2* | 2/2016 | Vorbach | G06F 9/345 |
| 9,805,304 | B2* | 10/2017 | Ross | G06N 3/063 |
| 9,910,822 | B2* | 3/2018 | Lemaire | H04L 47/828 |
| 10,049,322 | B2* | 8/2018 | Ross | G06F 15/8046 |
| 10,228,911 | B2* | 3/2019 | Henry | G06N 3/0481 |
| 10,282,348 | B2* | 5/2019 | Henry | G06F 9/44505 |
| 10,380,064 | B2* | 8/2019 | Henry | G06F 9/3001 |
| 10,409,767 | B2* | 9/2019 | Henry | G06F 9/30029 |
| 10,671,564 | B2* | 6/2020 | Henry | G06F 7/483 |
| 2014/0344203 | A1* | 11/2014 | Ahn | G06N 3/08 706/25 |

OTHER PUBLICATIONS

Chen, Y., et al., "DaDianNao: A Machine-Learning Supercomputer", 2014, Proceedings of the 47th Annual IEEE/ACM International Symposium on Microarchitecture, Cambridge, United Kingdom—Dec. 13-17, 2014, pp. 609-622 (Year: 2014).*

Piazza, F., et al., "Neural Networks with Digital LUT Activation Functions", 1993, Proceedings of 1993 International Conference on Neural Networks (IJCN N-93-Nagoya, Japan),Oct. 25-29, 1993 (Year: 1993).*

Chakradhar, S., et al., "A Dynamically Configurable Coprocessor for Convolutional Neural Networks", 2010, Proceedings of the 37th annual international symposium on Computer architecture,Saint-Malo, France—Jun. 19-23, 2010 , p. 247-257 (Year: 2010).*

Sankaradas, M., et al.,"A Massively Parallel Coprocessor for Convolutional Neural Networks", 2009, 20th IEEE International Conference on Application-specific Systems, Architectures and Processors,Boston, MA, USA, Jul. 7-9, 2009, p. 53-60. (Year: 2009).*

* cited by examiner

CONFIGURABLE AND PROGRAMMABLE MULTI-CORE ARCHITECTURE WITH A SPECIALIZED INSTRUCTION SET FOR EMBEDDED APPLICATION BASED ON NEURAL NETWORKS

CROSS-REFERENCE TO RELATED APPLICATIONS—CLAIM OR PRIORITY

The present application claims priority to U.S. Provisional Application No. 62/272,252, filed on Dec. 29, 2015, entitled "Configurable and Programmable Multi-Core Architecture with a Specialized Instruction Set for Embedded Application based on Neural Networks", which is herein incorporated by reference in its entirety.

BACKGROUND

1. Field

The present disclosure relates generally to computational modeling of convolutional neural networks.

2. Description of Related Art

Figure 1A:
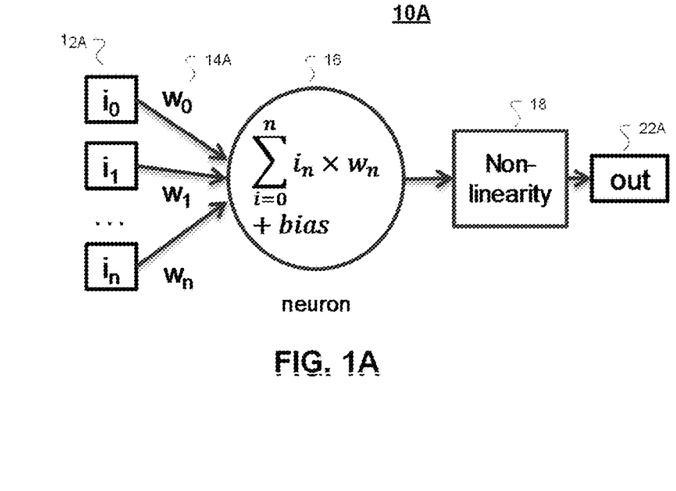
FIG. 1A is a simplified diagram of neuron processing model.
Figure 1B:
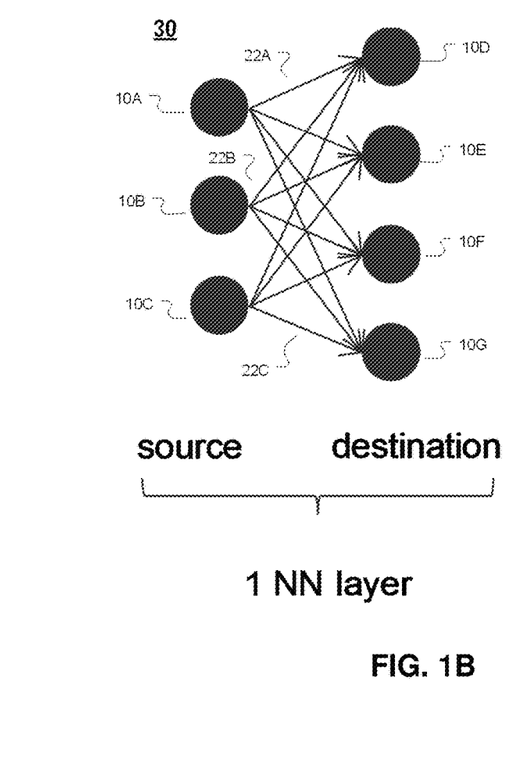
FIG. 1B is a simplified diagram of an artificial neural network (ANN)

Artificial neural networks (ANNs) are biology-inspired computational networks composed of multiple neurons (also called nodes or cells) connected together. FIG. 1A is a simplified diagram of an artificial neuron 10A and its operations (i.e., processing). As shown in FIG. 1A, each artificial neuron 10A may combine multiple inputs 12A together to produce one or multiple outputs 22A using adaptive weights, $W_n$, 14A (numerical coefficients). The weighted sum is applied to a non-linear "activation function" 18. In some cases, the activation function is the sigmoid function $f(z)=1/(1+\exp(-z))$. In other cases, the activation function is $f(z)=\tanh(z)=(e^z-e^{-z})/(e^z+e^{-z})$. Other activation functions are also well known. One key characteristic of artificial neural networks is that the weights, $W_n$ 14A applied to the input signals $i_n$ may be obtained through a learning algorithm. Artificial neural networks have proven useful to approximate complex non-linear functions in which several different inputs combine to formulate an output. FIG. 1B is a simplified diagram of connections between a fully connected artificial neural network layer 30 with 3 input nodes 10A-C and 4 output nodes 10D-10G. Each node is similar to the node shown in FIG. 1A. The arrows between nodes each represent an N×N set of weights.

Figure 1C:
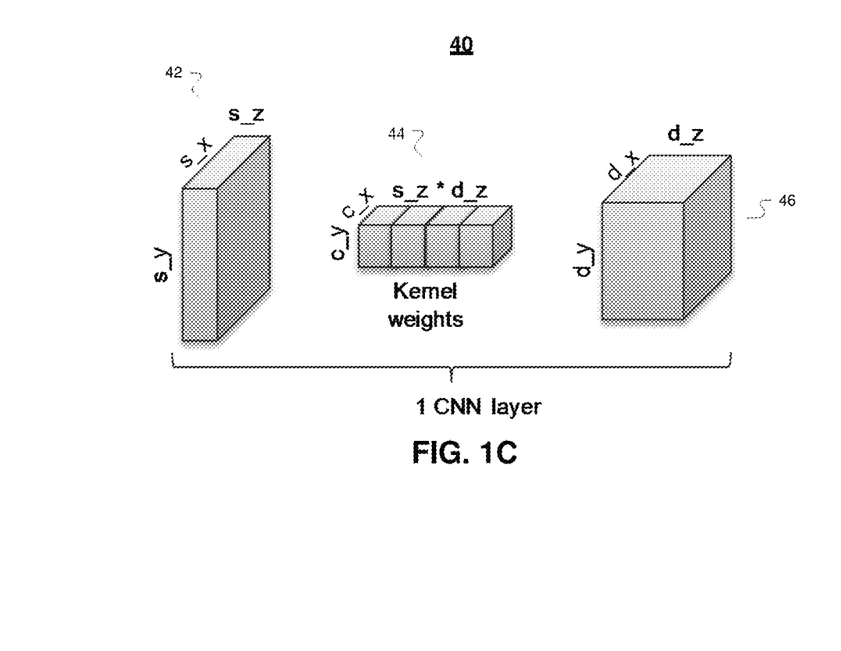
FIG. 1C is a simplified diagram of a convolutional neural network (CNN) layer.

A Convolutional Neural Network (CNN) 40 (see FIG. 1C) may be a processing mechanism based on deep general ANNs. Deep general ANNs are networks having more than two layers. FIG. 1C is a simplified diagram of a CNN layer 40 in which multiple images (each of size s_x times s_y) are convolved together to produce multiple outputs (along the z axis). In contrast to artificial neural networks, CNNs include multiple intermediate (hidden) layers of neurons 10A-G. That is, several layers of nodes lie between the input neurons and the output neurons. Each node performs a mathematical operation, known as a convolution, on its inputs. Nodes of a CNN 40 may be arranged in such a way that they process overlapping regions of inputs by sharing kernel weights over multiple input locations (i.e., portions of the input data). CNNs 40 may also use spatial subsampling and may pool the outputs of convolutions between layers. The concepts of subsampling and pooling are beyond the scope of this discussion and for simplicity are not discussed in detail. However, such techniques are well known in the art. Such techniques may make CNNs 40 particularly well suited to process images and videos. Examples of CNN 40 applications to which CNNs 40 are well suited include pattern recognition, visual object detection algorithms, and speech recognition.

In the CNN 40, each layer applies a set of convolution kernels 44 to some or all of the input matrices 42 provided from a previous layer. Different applications (e.g., face detection, object recognition, scene labeling, etc.) may be implemented by employing different graph topologies of interconnected layers in which data flows from layer to layer in a feed-forward network. In one case, the first layer may receive input matrices 42 that contain data to be analyzed, for example captured images or audio sequences. The last layer generates the output matrix that in some cases represents whether a particular object or objects were detected. In addition, the output may also provide data indicating a level of certainty (probability) regarding whether each object was detected.

Even when different CNN-based applications share common goals, each CNN-based application might have a different network topology (graph) of interconnected processing layers, different sets of convolution weights (kernels), and different subsampling factors. In addition, CNN-based applications require parallel convolutions that involve several multiply-accumulate operations and nonlinear activation functions. The data flow through a CNN based application may require hardware implementations or software that employs graphic processing unit (GPU) accelerators. Currently, hardwired solutions for implementing CNN applications are inflexible and high-performance GPUs are not suitable due to their large physical area or footprint and high power consumption. Accordingly, there is a need for a solution that can reduce the area, reduce the power required and increase the flexibility of the CNN architecture to handle different configurations.

SUMMARY

Some embodiments disclosed herein include a programmable architecture specialized for CNN processing such that different applications of convolutional neural networks (CNNs) may be supported by reprogramming the processing elements. CNN processing is provided that can be consistently configured to detect different types of objects due to the programmable implementation of a CNN 40 in accordance with at least some of the embodiments disclosed herein. It may be desirable for embedded hardware implementations used within the CNN 40 to be highly optimized for area and power while achieving acceptable performance as a function of the intended environment. An optimized CNN architecture for the embedded space may be well-suited for use in computer vision, augmented reality, advanced driver assistance systems, video surveillance and robotics. Some of the embodiments disclosed herein include an optimized architecture that provides a low-area (i.e., small footprint) and low-power solution for embedded applications, while still providing the computational capabilities desirable for CNN applications that may be computationally intensive and which may use a large number of convolution operations per seconds to process inputs, such as video streams, in real time.

Some of the embodiments of the architecture disclosed herein include a plurality of Processing Elements (PEs), where each PE is an Application Specific Instruction Processor (ASIP) designed specifically for use with a specialized instruction set optimized for CNN processing. Accordingly, some embodiments disclosed herein may include a specialized instruction set architecture (ISA) developed for CNN processing. The presently disclosed method and apparatus may further include a reconfigurable streaming interconnect that is used to connect through a set of FIFO (first-in first-out) buffers to a set of PEs, such that different graph topologies of CNN processing may be supported.

BRIEF DESCRIPTION OF THE DRAWINGS

The features, objects, and advantages of the presently disclosed embodiments will become more apparent from the detailed description set forth below when taken in conjunction with the drawings in which like reference characters identify like features throughout and wherein.

DETAILED DESCRIPTION

Throughout this description, embodiments and variations are described to illustrate uses and implementations of the presently disclosed method and apparatus. The disclosure provided herein should be understood as presenting examples of the presently disclosed method and apparatus, rather than as limiting the scope of the claimed invention. Accordingly, the scope of the claimed invention should be defined exclusively by the claims appended to this disclosure, which are supported by this disclosure.

Figure 2:
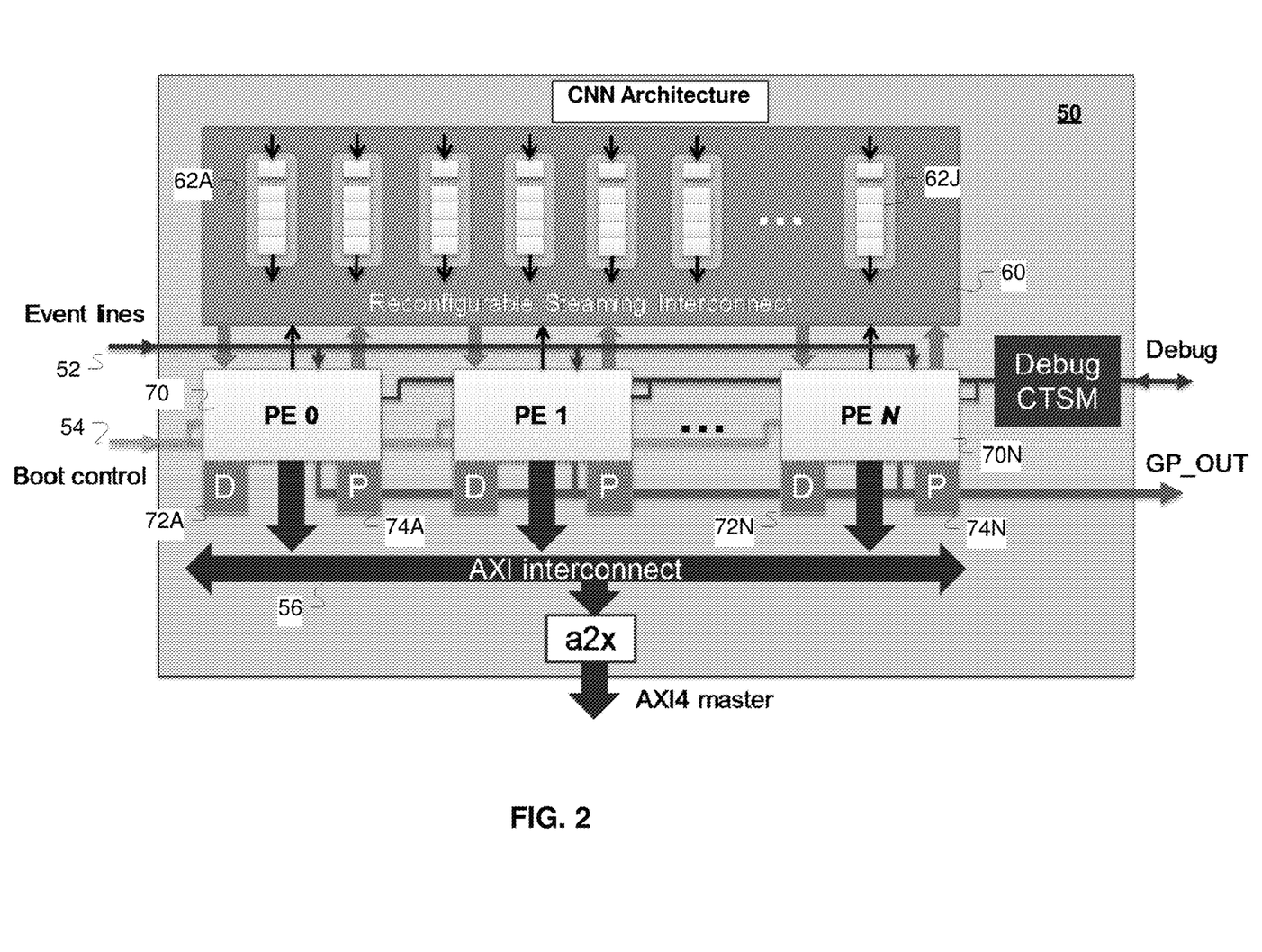
FIG. 2 is a simplified block diagram of a CNN architecture in accordance with some embodiments of the presently disclosed method and apparatus.

FIG. 2 is a simplified block diagram of a convolutional neural network (CNN) architecture 50 (sometimes referred to as an "engine") in accordance with some embodiments of the presently disclosed method and apparatus. The CNN architecture 50 presents one variant of the proposed architecture in accordance with some embodiments of the presently disclosed method and apparatus. As shown in FIG. 2, the CNN architecture 50 includes a reconfigurable streaming interconnect module 60 coupled to N processing elements (PE) 70A-N. The interconnect module 60 may include several (e.g., 10) FIFOs 62A-J whose input and outputs are reconfigurably coupled to one or more PEs of the N PEs 70A-N. "N" is presented in italics to represent that it is a variable and not intended to indicate that there are a fixed number of PEs A-N (i.e., 13). Furthermore, when referring generally to the PEs, they are designated as PEs 70. This convention applies to other features and components shown in the figures and discussed through this disclosure.

In some embodiments, each PE 70 may have a separate corresponding program (P) memory 74 and corresponding data (D) memory 72, such that there is a one-to-one relationship between each PE 70, one program memory 74 and one data memory 72. Alternatively, one or more PEs 70 may be coupled to one or more data memories 74 or program memories 72. The CNN architecture 50 may function as a soft Instruction Processor (IP) that can be configured before synthesis/implementation and then programmed on or for the final target. The CNN architecture 50 may include event lines 52 to receive events (interrupts) via input signals and a boot control interface 54 functioning as a register interface to configure booting of the CNN architecture 50.

Due to the programmability of the PEs 70 as well as the flexibility of the streaming interconnect module 60, the architecture 50 may be configured "in the field" to implement a wide range of diverse CNN processing applications. In some embodiments, a commercially available Synopsys Application Specific Instruction Processor (ASIP) technologies (ASIP Designer tool) may be employed to create a CNN accelerator IP that is both configurable before physical implementation and remains programmable afterwards.

Figure 3:
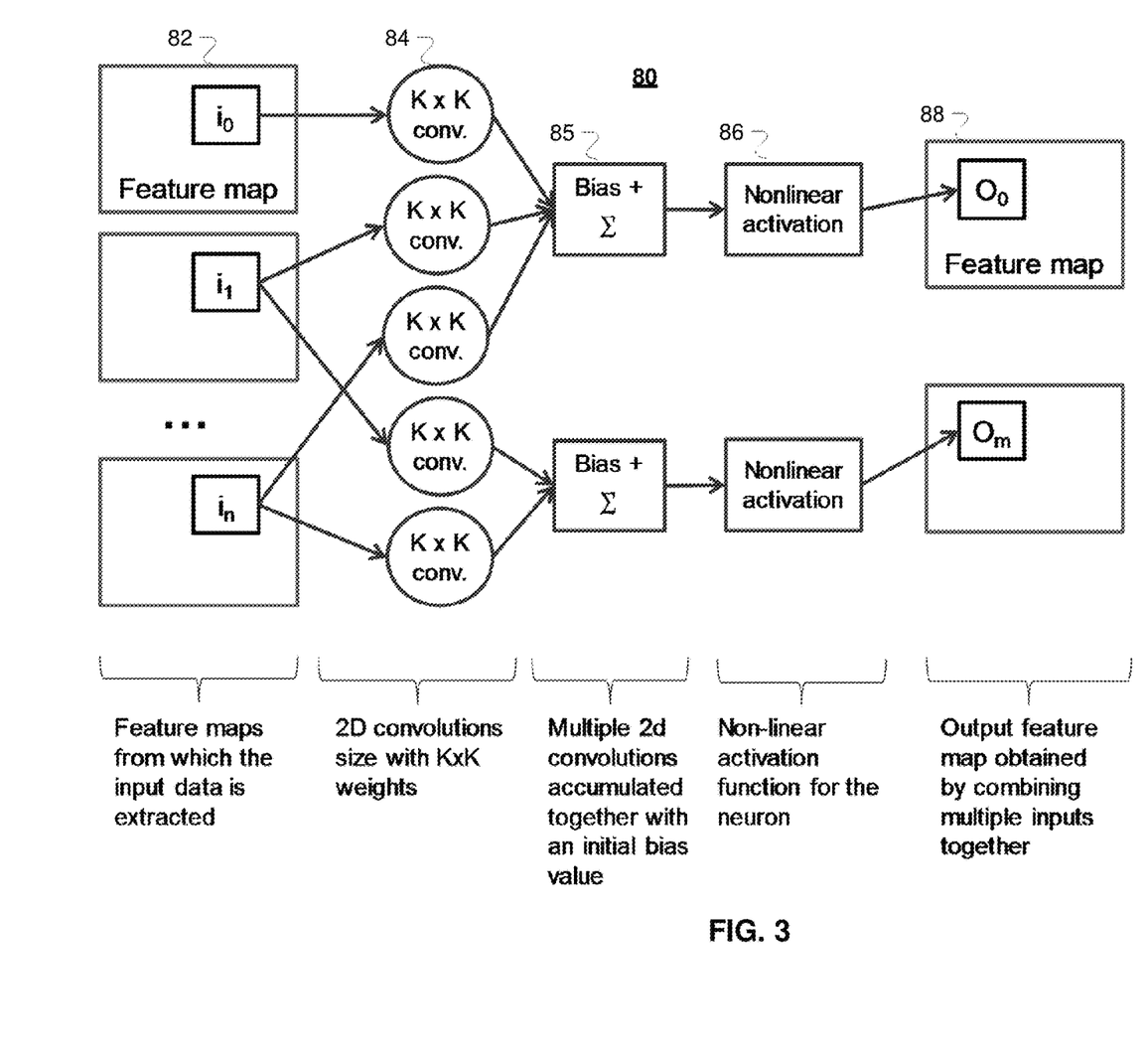
FIG. 3 is a simplified block diagram of activities in a CNN layer in accordance with some embodiments of the presently disclosed method and apparatus.

FIG. 3 is a simplified block diagram of activities in a CNN layer 80 such as layer 40 shown in FIG. 1C in accordance with some embodiments of the presently disclosed method and apparatus. In some embodiments, the PEs 70 of the CNN architecture 50 have a specialized instruction set to optimize both the main computation steps of the CNN and the typical data movements required to implement those computational steps (i.e., reading data from and writing data to different sections of the CNN). The specialized instructions include multiple parallel multiplier-accumulators (MACs), look-up table (LUT) accelerators for the non-linear activation functions, synchronization primitives for multi-processing and communication with external cores, as well as data movement and buffer management functions. In the data movement category, the specialized instructions may include direct memory access and transfer (DMA) functions that may load/store data on the external interfaces (via the AXI interconnect 56 in FIG. 3), FIFO push/pop functions to communicate and synchronize with the streaming interconnect module 60 and instructions to load/store vector registers in local memory.

Figure 4:
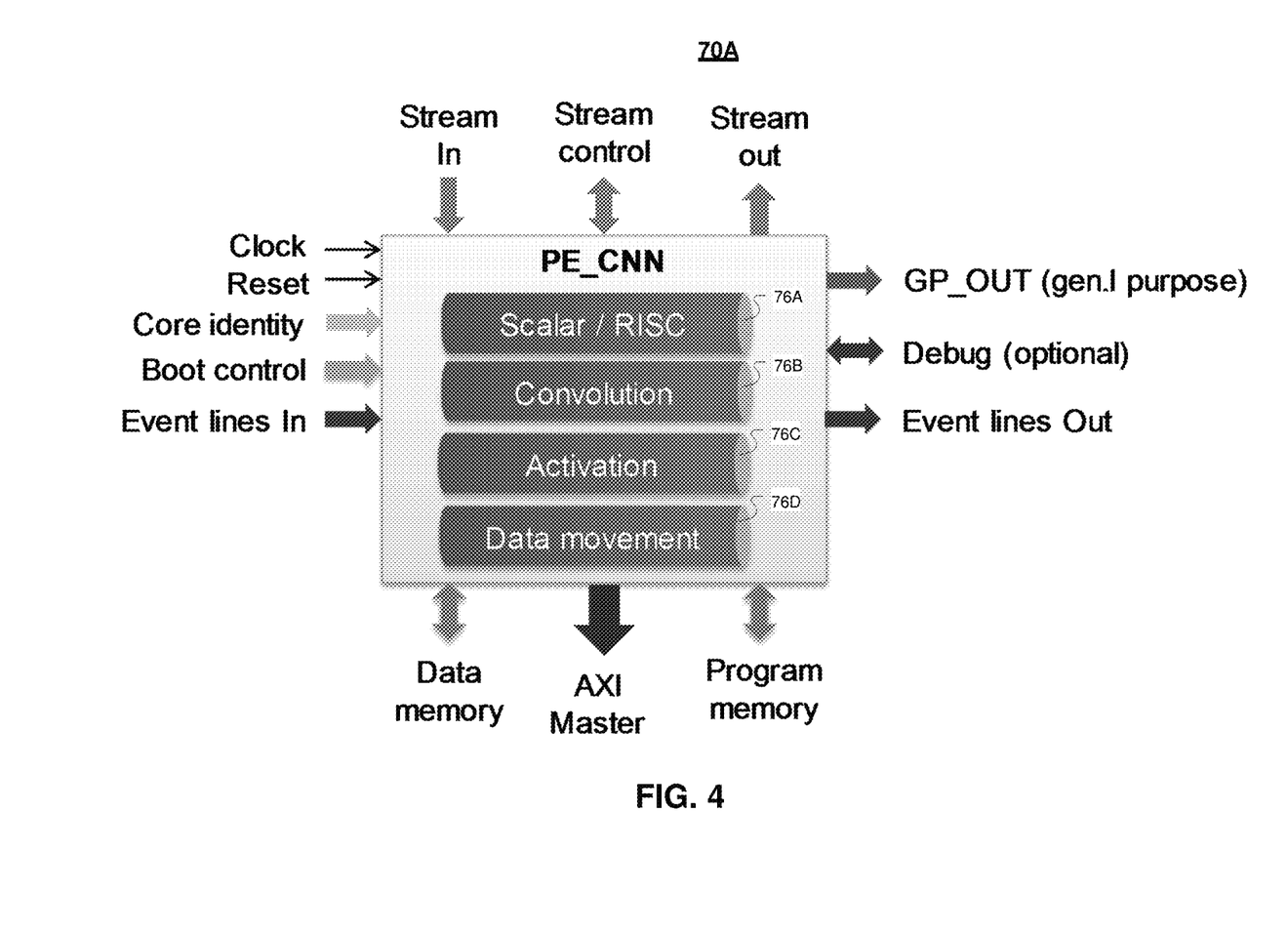
FIG. 4 is a simplified block diagram of a processing element detailing interfaces and internal instruction pipelines in accordance with some embodiments of the presently disclosed method and apparatus.

FIG. 4 is a simplified block diagram of a processing element 70 detailing interfaces and internal instruction pipelines in accordance with some embodiments of the presently disclosed method and apparatus. In some embodiments, different sets of instructions inside the PEs 70 can be mapped to different instruction pipelines 76. Such mapping allows parallel processing and thereby increases resource usage and performance as shown in FIG. 4. Accordingly, a PE 70 may include a typical instruction pipeline (76A) to execute basic scalar operations (register load/store, basic ALU, jump, etc.), as well as some other CNN-related instructions executed in few cycles, such as a wait event. A PE 70 may also include independent pipelines 76B-D for FIFO accesses, convolutions 76B, non-linear activation functions 76C, and instructions requiring many cycles such as DMA operations 76D.

Since the convolution and activation functions are key components of the process performed in each CNN layer, in some embodiments, they are performed using dedicated vector registers. In some embodiments, the vector registers are arrays of hardware flip-flops capable of holding data and passing the data to and from the PE 70. Two kinds of vector registers are provided: A-registers (accumulators) and W-registers (windows). In some embodiments, an A-register is used to hold intermediate values calculated during the parallel processing of N convolutions for one layer. The matrix elements 42, 44 (see FIG. 1C) used for the N parallel convolutions are stored in the W-registers. To support N parallel convolutions with a kernel having R rows and C columns, D is equal to at least R+1, where D is the number of W registers. L is equal to at least the greater of R times C and 8N, where L is the number of elements in each of the W registers. Using these registers (i.e., "data structure"), four convolution instruction variants may be supported. Each convolution instruction variant may be geared towards a different type of access pattern for the inputs and outputs of the convolution. In some embodiments, a CNN layer nonlinear activation function 86 may be implemented using an LUT mapped in the tightly-coupled data memory. The LUT may be optimized by using large data word accesses in the data memory 72 and by keeping a number of previously looked-up data words in local registers in some embodiments.

Based on the above configuration, one or more PEs 70 may efficiently implement the processing within a CNN layer or a part of the CNN layer. In some embodiments, one or more PEs 70 may operate/execute in parallel, following a pipeline mechanism implemented with additional PEs 70, to implement the processing of the layers of a CNN application. To be efficient, every PE 70 in this pipeline should be active as much as possible. Some embodiments may provide point-to-point channels (FIFOs 62A-J) as a communication mechanism between PEs 70 to increase PE efficiency. In some embodiments, the point-to-point connections are also runtime programmable to enable design flexibility. The point-to-point connection programmability enables dynamic association of a FIFO hardware resource 62A-J to a dedicated communication channel between any two PEs 70. A PE 70 may even "loopback" a FIFO 62A-J onto itself in some embodiments.

As shown in FIG. 2, CNN architecture 50 may include many PEs 70 connected together via FIFOs 62 of the interconnect module 60. In some embodiments, a PE 70 may employ a Harvard or von Neumann memory architecture (Harvard—separate program or instruction memory and data memory and von Neumann—shared memory). In some embodiments, each PE 70 may have its own tightly coupled data memory 72 and program memory 74 (Harvard memory Architecture). In some embodiments, each PE 70 may include or consist of an ASIP specialized or developed to optimize CNN layer processing. In some embodiments, a PE 70 may include a set of vector registers, multiple MACs to enable parallel convolution calculation to generate multiple elements of an output matrix, such as feature map 88, and special hardware for non-linear transformations (neuron activation simulation). An output matrix, such as feature map 88, may comprise multiple consecutive element positions of the same matrix or same element position of different output matrices. In some embodiments, a PE 70 may also enable data to be moved in and out of this memory while performing computations (on other data) in parallel.

As shown in FIG. 4, a PE 70A of some embodiments may include several pipelines 76A-76D that may operate in parallel to optimize CNN layer processing. A PE 70 may support multiple instruction groups via configured pipelines 76. The supported instruction groups may include data transfer instructions via the data movement pipeline 76D. The data transfer instructions may enable a PE 70 to employ DMA including sequencing loads (resp. stores) between external memory and local memory, push and pop access with FIFOs 62, and load and store vector registers in local memory (data memory 74 in some embodiments). The supported instruction groups may also include synchronization instructions via the Scalar/RISC pipeline 76A. The synchronization instructions may enable a PE 70 to wait for an event or raise an event. The supported instruction groups may also include convolution and maxpooling instructions via the convolution pipeline 76A. The convolution and maxpooling instructions may enable a PE 70 to perform various convolution calculations. The supported instruction groups may also include neuron activation simulation instructions via the activation pipeline 76C. The neuron activation simulation instructions may enable a PE 70 to perform various non-linear operation applied on the convolution results to simulate neuron activations.

The PE 70 pipelines 76 may allow parallel operations for different instructions. Such a configuration may enable cycle intensive instructions to be processed efficiently and in parallel including: (1) Read DMA and Write DMA where the number of instruction cycles depends on the data transfer size; (2) load and store vector registers where the number of cycles depends on the number of elements being moved; (3) push and pull FIFO where the number of cycles depends on the number of elements pushed or popped; (4) convolution where the number of cycles depends on the kernel size; and (5) activation function, such as sigmoid LUT, where the number of cycles depends on the number of elements not in the LUT. In some embodiments, the scalar/RISC 76A pipeline may be a typical instruction pipeline. The scalar/RISC 76A may execute basic scalar operations including register load/store, basic ALU, jump as well as some other CNN-related low cycle instructions, such as a wait event.

A PE 70A with pipeline 76 may enable data movement to be performed in parallel with the core CNN layer processing (convolution and sigmoid calculations in some embodiments). Such a PE 70A may keep key CNN hardware units busy thus increasing performance and resource usage. Increasing PE pipelines may increase area. In order to optimize (and minimize) PE area, without loss of generality, the number of parallel pipelines may be reduced. PE processing is not impacted, including core processing pipelines. In some embodiments read and write DMA pipelines may be shared, as well as push and pop FIFO pipelines. Further, to avoid data movement bottlenecks, the bit width of a PE 70 tightly coupled data memory 72 may be made very wide in some embodiments.

As shown in FIG. 3, the convolution 84 and non-linear activation 86 (sigmoid in some embodiments) operations are elements of CNN layer processing. In some embodiments, the convolution 84 and non-linear activation 86 processing are performed using dedicated vector registers. As noted above, two types of vector registers may be employed. The first type are Accumulation registers (A-registers) denoted as A[M][N], where M is the number of parallel processes in each convolution, N is the number of convolutions being worked on in parallel. The second type are Window registers (W-registers) denoted as W[D][L], where D is the number of W-registers and L is the number of elements in each W-register. An A-register A[m][N], 0<=m<M, may be used to hold initial and final values for the processing of N convolutions in parallel, one element per convolution, where m is the number of the particular output feature maps stored in that A-register. Multiple A-registers may be provided, allowing convolution processing to be performed concurrent with other operations that employ A-registers, such as the nonlinear activation 86 operation and simply moving data from or into A-registers. A typical value of M=2 can be sufficient in some embodiments.

In some embodiments, the matrix elements 42, 44 used for the N parallel convolutions may be stored in a group of W-registers. To support N parallel convolutions, with a kernel of size R×C (R rows, C columns), D is equal at least R+1 and L is equal to at least MAX(RC, NC) (i.e., the maximum of R times C and N times C). Using the A[M][N] and W[D][L] configurations, four convolution calculations may be employed in embodiments, denoted as Conv0, Conv1, Conv2, Conv3.

In one convolution calculation denoted as the function Conv0(m, R, C, k), the register A[m] [ ] may be used to hold the initial and final results, the size of the kernel may be R times C, and the registers W[0] to W[N−1][ ] may each holds R times C elements of N input Matrices, while register W[k][ ] may hold R times C elements of a kernel. The following Conv0 computation may be completed in R times C clock cycles, with N MACs per cycle:

$$A[m][i]=A[m][i]+\sum_{j=0}^{RC-1}(W[i][j]*W[k][j]), \text{ for } i=0 \text{ to } N-1$$

In another convolution calculation denoted as the function Conv1(m, R, C, k), the register A[m][ ] may be used to hold the initial and final results, the size of the kernel may be R×C, the registers W[0] to W[R−1][ ] may each hold at least N+C−1 elements of R consecutive rows of an input Matrix (same column positions), while register W[k][ ] may holds R times C elements of a kernel. The following Conv1 computation may be completed in R times C clock cycles, with N MACs per cycle:

$$A[m][i]=A[m][i]+\sum_{r=0}^{R-1}(\sum_{c=0}^{C-1}(W[r][c+i]*W[k][Cr+c]), \text{ for } i=0 \text{ to } N-1$$

In a third convolution calculation denoted as the function Conv2(m, R, C, k), the register A[m][ ] may be used to hold the initial and final results, the size of the kernel may be R×C; the registers W[0] to W[R−1][ ] may each hold at least 2N+C−2 elements of R consecutive row of an input Matrix (same column positions), while register W[k][ ] may hold R times C elements of a kernel. The following Conv2 computation may be completed in R times C clock cycles, with N MACs per cycle:

$$A[m][i]=A[m][i]+\sum_{r=0}^{R-1}(\sum_{c=0}^{c-1}(W[r][c+2i]*W[k][Cr+c]), \text{ for } i=0 \text{ to } N-1$$

In a 4th convolution calculation denoted as the function Conv3(m, R, C, k), the register A[m][ ] may be used to hold the initial and final results, the size of the kernel may be R×C; the registers W[0] to W[R−1][ ] all together may hold R times C groups of N consecutive elements of different R times C inputs (same row/column positions), while register W[k][ ] may hold R times C elements of a kernel, one element associated with each input matrix. The following Conv3 computation may be completed in R times C clock cycles, with N MACs per cycle:

$$A[m][i]=A[m][i]+\sum_{r=0}^{R}(\sum_{c=0}^{C}(W[r][Nc+i]*W[k][Cr+c]) \text{ for } i=0 \text{ to } N-1$$

In some embodiments the Conv1( ) function may implement the classic convolution of a kernel over a section of an image, producing M consecutive elements of one line of the output matrix. The function Conv2( ) is similar to function Conv1( ) except that a subsampling factor of 2× or 4× may be implemented at the same time (that is, the output matrix line is 2× or 4× narrower) in some embodiments.

In some embodiments, the Conv3( ) function may be a special scenario/state occurring in the last layer of a CNN-application in which classification may be performed by summing all the input matrix after trivial convolution with a 1×1 kernel. To increase parallelism in some embodiments, the Conv3( ) function enables processing over N elements of R times C input images, processing N MACs in parallel.

The Conv0( ) function may be employed when a convolution is applied to only a limited number of positions. In this case, the R times C convolution may be applied over N different input matrices, all at the same position, resulting into N elements, each one being part of a different output matrix.

In some embodiments, max-pooling may consist of selecting the maximum value within a N×N input matrix. It shares some commonalities with the convolution function because it may be implemented using the same A and W registers where the MAC operation is replaced by a MAX operation. For each position i in a set of W[0] to W[N−1] registers the maximum value may be found and stored in register A[m][i]. The max-pooling instruction also enables a subsampling factor which will determine by how many elements (if any) the N×N matrix overlap on the input plane.

Another CNN specific operation that may be implemented by a PE 70 is the neuron activation 86 as represented by a non-linear computation in some embodiments. Neuron activation as represented by a non-linear computation may be implemented in different ways. In some embodiments, an optimized LUT-based implementation using a 2-step process of parallel saturation and parallel look-up may be employed.

In some embodiments, the LUT function may be mapped in the tightly-coupled data memory 74 of each PE 70. The bit width of each LUT element may correspond to the bit width of the output matrix elements after non-linear transformation (typically 8 or 16 bits in some embodiments). The number of elements in a LUT corresponds to the "precision" or quality of the approximation and may be application-specific. In some embodiments, a saturate function may be provided to saturate each value after convolution to a maximal value. The saturate function may be applied in parallel to the N elements of a provided A[m] [ ] register. Then each i-th element after saturation of the vector A[m] [ ] may be replaced by LUT[A[m][i]]. In some embodiments, the data memory word width is much larger than the LUT-element width, so many lookups may be performed at the same time for a specific data word. In addition in some embodiments, a number of data words that were previously looked-up may be kept in local registers to further minimize memory requests. This is somewhat analogous to an instruction cache (in particular, no write back may be required). In such an embodiment, an element is first looked-up inside the cached set of LUT data words, limiting data memory requests to only non-cached elements.

The resultant accelerated LUT functions may be used to approximate nonlinear activation functions such as sigmoid or hyperbolic tangent (tan h) to simulate neuron activations. In some embodiments, LUT functions may also be used to approximate other functions which may be costly to implement on a small processor including exponentials. Exponentials may be part of a softmax regression operation used at the end of the CNN processing to get a probabilistic answer in the last layer of a CNN graph. In another embodiment a rectifier which is simply f(x)=max(0,x) may be used as a non-linear function. A PE 70 may include an instruction to extract such a value from each element in the W registers while also optionally applying a parallel saturation operation on the output.

In some embodiments that employs the convolutions and activation functions as described, a PE 70 may be able to efficiently implement the processing included in a CNN layer as shown in FIG. 3. Dependent on the layer processing requirements, a PE 70 may be able to implement/process several layers. Via a pipeline mechanism (include pipelines shown in FIG. 4), PEs 70 may be able to execute in parallel to process all layers of a CNN application. To be efficient, each PE 70 should be active or employed as much as possible. To increase or maintain PE 70 utilization, point-to-point channels (FIFOs 62 of interconnect module 60 in some embodiments) are provided as a communication mechanism between PEs 70. To maximize PE 70 utilization and enable runtime configurability, the point-to-point connections should be programmable.

In some embodiments, the number of FIFOs 62 (see FIG. 2) and their depth may be varied during design as function of the number of PEs and convolution configurations to be processed. In some embodiments, FIFO to PE connectivity may be configured such that each FIFO 62 input is associated with only one PE 70 and each FIFO 62 output is also associated with only one PE 70. In such an embodiment, a simple multiplexer/de-multiplexer network may be sufficient to enable runtime reconfigurable interconnections. No arbitration mechanism may be required since the FIFO-PE connections, once configured, are point-to-point. Since a PE 70 may have many inputs and be thereby coupled to many FIFO 62 outputs, a unique identifier may be associated with each FIFO. This ID may be provided with the push & pop instructions from a PE 70 in some embodiments. In some embodiments, a PE 70 may access an associated FIFO to provide data via either a blocking (wait for data availability/free space) or non-blocking (must retry an empty/full exception is returned) manner to enable flexible application programming.

Figure 5:
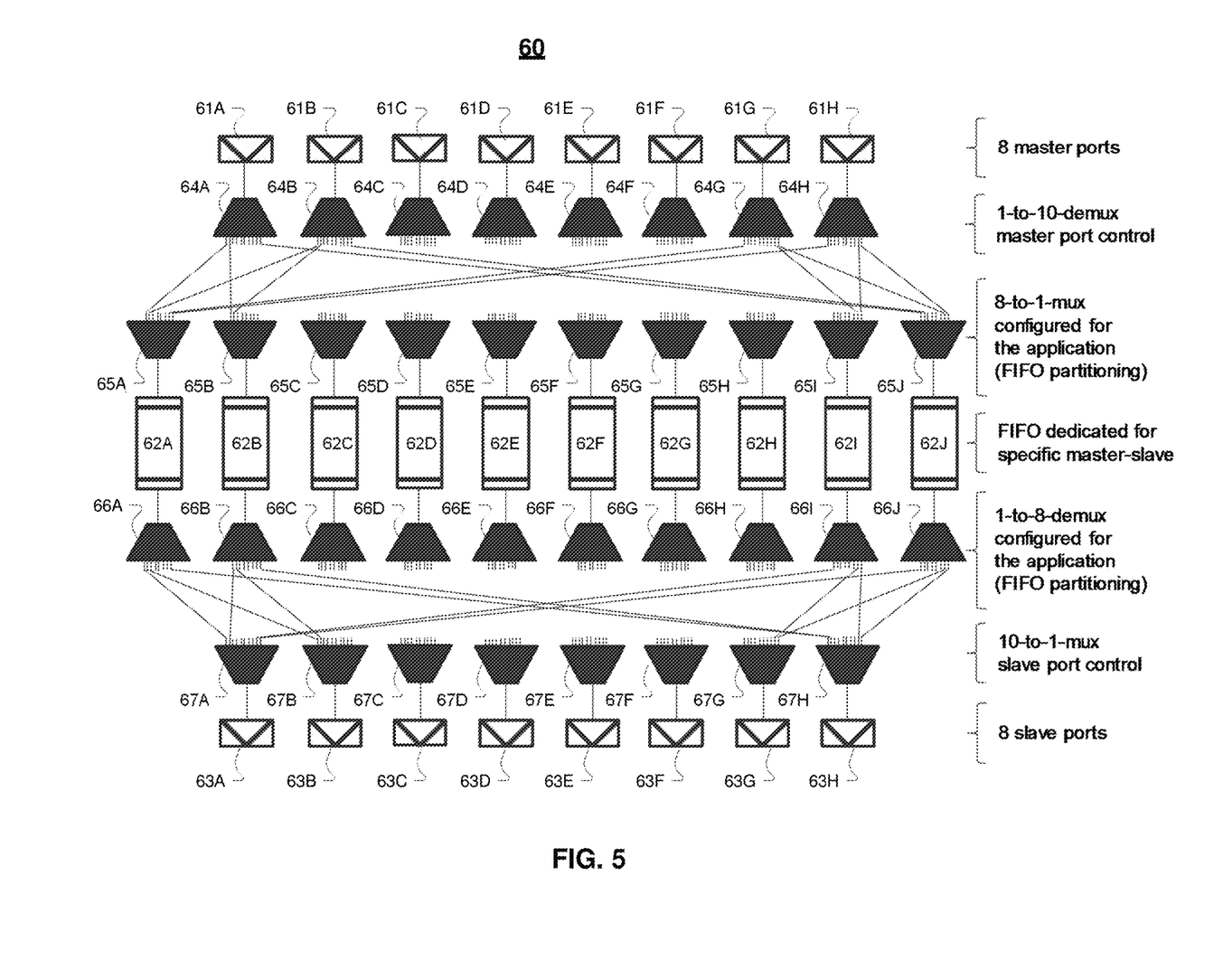
FIG. 5 is a simplified diagram of a reconfigurable streaming interconnect module including 10 FIFOs configured to be coupled to 8 PEs in accordance with some embodiments of the presently disclosed method and apparatus.

In some embodiments, a proposed reconfigurable interconnect architecture may include more FIFO than PEs. FIG. 5 is a simplified diagram of a reconfigurable streaming interconnect module 60 including 10 FIFOs 62 configured to be coupled to 8 PEs via 8 outputs 61A-H and 8 inputs 63A-N. The reconfigurable streaming interconnect module 60 may include 8 master input ports 61A-H, 8 master output ports 63A-H, 10 FIFOs 62A-J, 8 input demultiplexers (demux) 64A-H, 10 input multiplexers (mux) 65A-J, 10 output demux 66A-J, and 8 output mux 67A-H. The 8 master input ports 61A-H may be coupled to each input demux 64A-H, respectfully. The input demux 64 may be configurably coupled to any of the input mux 65. The input mux 65 may be coupled to the FIFOs 62, respectively. The 10 FIFOs 62 may be coupled to each output demux 66, respectfully. The output demux 66 may be coupled to any of the output mux 67. The output mux 67 may be coupled to the master output ports 63, respectively.

Figure 6:
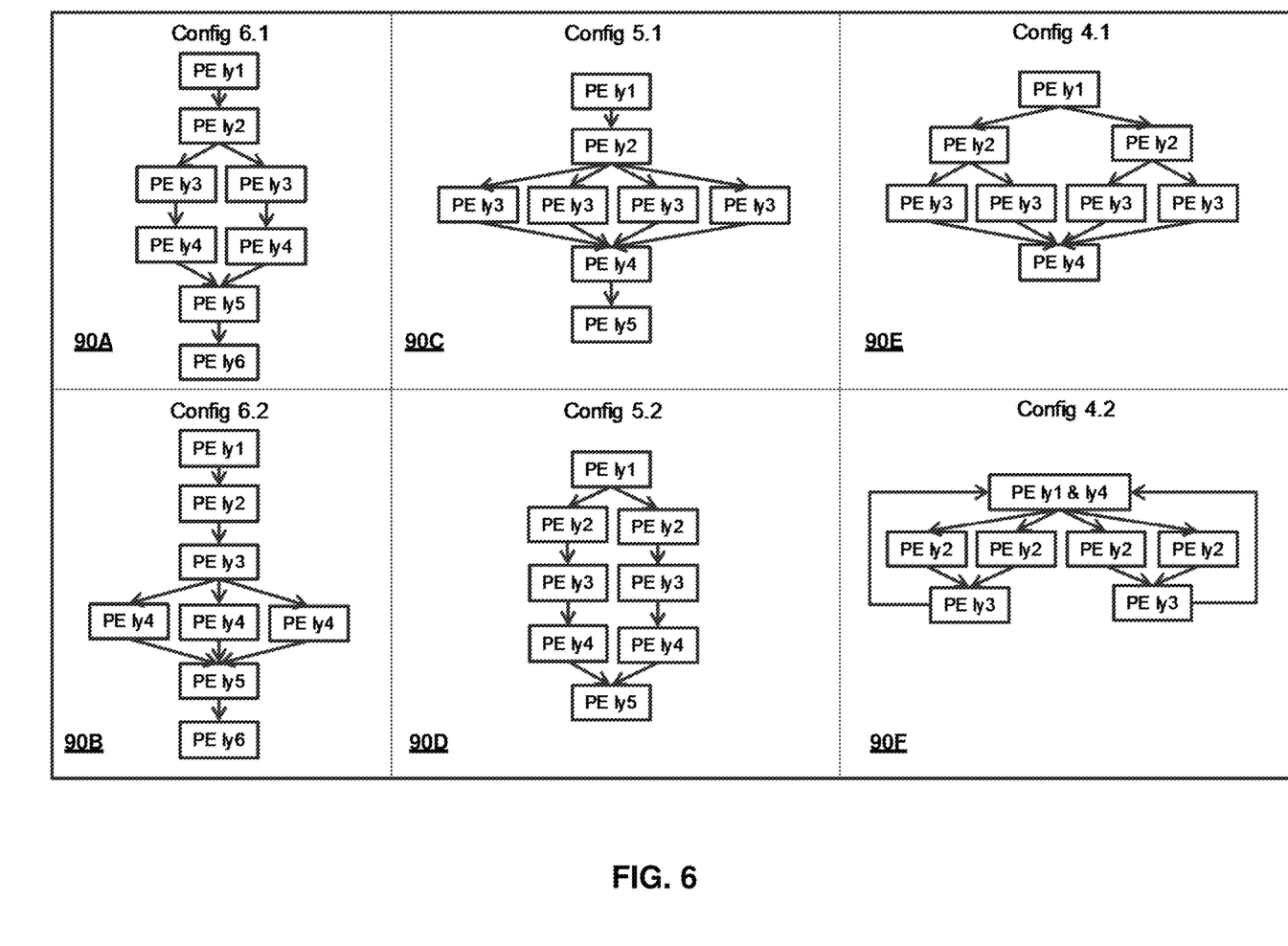
FIG. 6 are simplified diagrams of multilayer CNN configurations in accordance with embodiments of the presently disclosed method and apparatus.

The multiplexers 65 and 67 and demultiplexers 64 and 66 may be runtime configurable and enable the FIFOs 62 to be reconfigured based on the CNN layers to be supported/implemented. Due to the configurability of the multiplexers 65 and 67 and demultiplexers 64 and 66, many different CNN graph topologies may be supported or implemented by the same hardware instance. FIG. 6 illustrates simplified diagrams of multilayer CNN configurations or "graph topologies" 90A-F in accordance with embodiments of the presently disclosed method and apparatus. Each configuration 90 including several layers (6 in 90A and 90B, 5 in 90C and 90D, and 4 in 90E and 90F) and require one to four PEs 70A in each layer.

The combination of architecture 50 with PEs 70 as shown in FIG. 4 and a reconfigurable streaming interconnect module 60 shown in FIG. 5 enables re-configurability for different CNN graph topologies while requiring a small footprint (low-area) and reduced power consumption (low-power) over general digital signal processing (DSP) or related systems. On the hardware side, architecture 50 enables the selection of many hardware parameters including the number of PEs 70, the number of FIFOs 62, each FIFO 62 depth, tightly coupled data memory size(s) 74 and bit width, and tightly coupled program memory size(s) 72. In some embodiments, tools may be employed to optimize the functionality of the reconfigurable streaming interconnect module 60 including multiplexers 65 and 67 and demultiplexers 64 and 66 and FIFOs 62, the tools may include the commercially available Synopsys DesignWare ARChitect tool.

In some embodiments, PEs 70 employed in architecture 50 may be modeled with a language including the commercially available Synopsys ASIP Designer nML processor description language. In combination with ASIP PEs, their instructions may be optimized for CNN applications and variants of non-linear functions. In some embodiments, the architecture 50 hardware design, compilation chain, and simulator may all be generated from nML source. In such an embodiment, other architectural parameters may be easily configured including the number of vector registers, their width, the number of scalar registers, the convolution weights bit width, and the number of parallel MAC units employed for the convolutions.

Further, the specialized CNN instructions implemented by the PEs in combination with multiple instruction pipelines (FIG. 4), may enable the architecture 50 to overlap data movement with core CNN processing operations such that high utilization of the parallel MAC units are achieved. In some embodiments, CNN graph applications may achieve high resource utilization with near-optimal performance for the provided hardware; up to 90% or more resource utilization in some embodiments.

Figure 7:
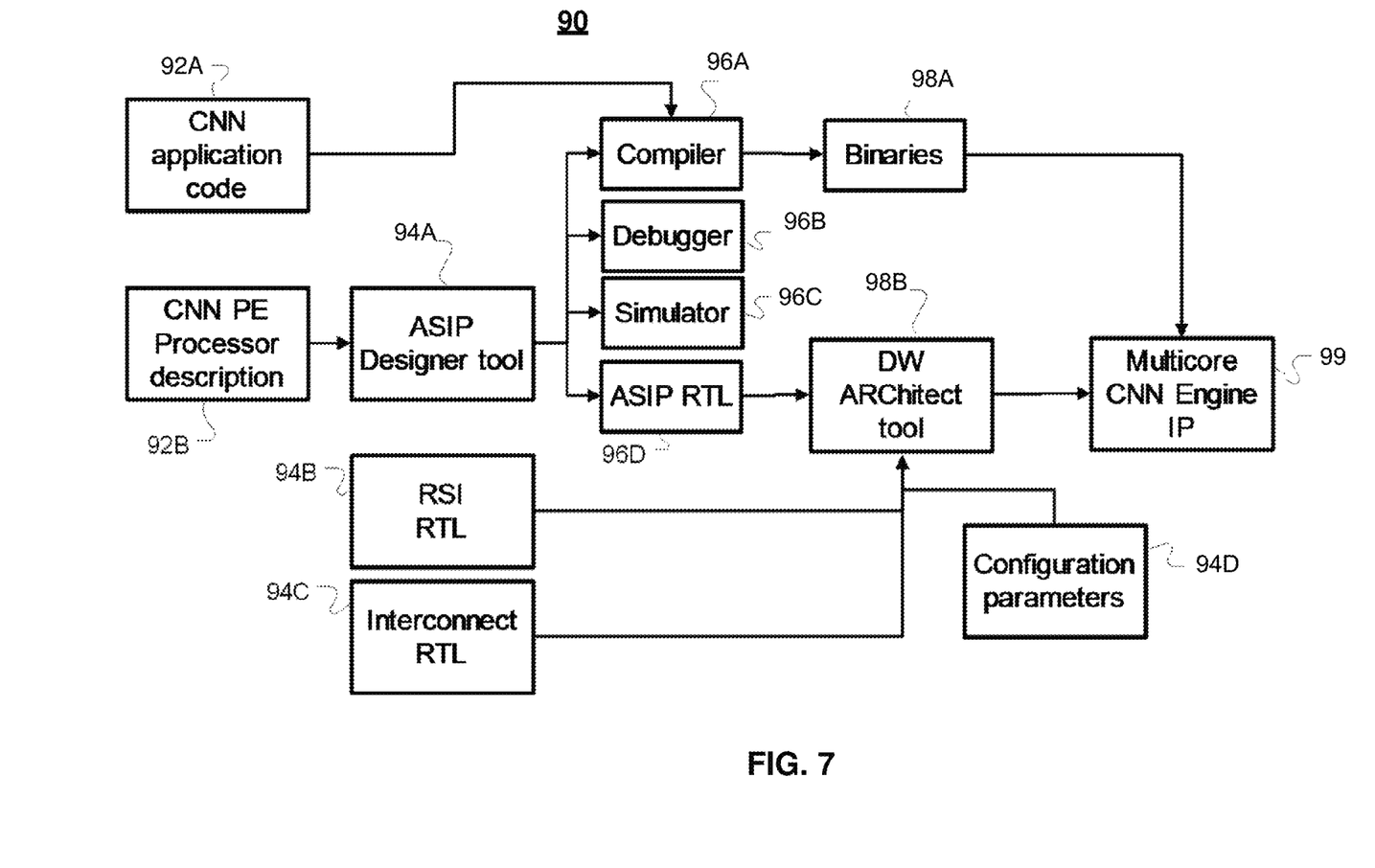
FIG. 7 is a simplified block diagram of design flow of a multicore CNN Engine Instruction Processor (IP) in accordance with some embodiments of the presently disclosed method and apparatus.

In some embodiments, a processor may be programmable using the C language. In such an embodiment, CNN layer processing may be easily mapped on each PE and configured for the specifics of each application. The application specifics may include the type and size of a kernel, the size of the input and output matrices, the type of sigmoid or non-linear activation function, and the processing connectivity between output matrixes and input matrixes. Furthermore, the reconfigurable streaming interconnect module coupled to PEs of an architecture 50 enable application-specific instances of CNN graph topologies to be adapted to each resultant architecture 50. FIG. 7 is a simplified block diagram of a design flow architecture 90 of a multicore CNN Engine IP 99 in accordance with some embodiments of the presently disclosed method and apparatus.

As shown in FIG. 7, a designer may provide a CNN application code 92A and CNN PE description 92B to the design flow architecture 90. A designer may employ ASIP technologies including the commercially available Synopsys ASIP Designer tool to configure the PEs. The CNN application code 92A and the ASIP Designer tool module 94A configuration may be supplied to a compiler module 96A, debugger module 96B, simulator module 96C and Application Specific Instruction Processor ASIP register-transfer level RTL module 96D. The compiler module 96A may generate PE binaries 98A based on the CNN application code 92A and the ASIP Designer tool module 94A configuration. Architecture 90 may employ an overall flow architecture tool, such as the Synopsys DesignWare ARChitect tool module 98B to configure flow between PEs based on data from the ASIP RTL 96D, a Reconfigurable streaming interconnect (RSI) register-transfer level (RTL) module 94B and a Interconnect register-transfer level register-transfer level RTL module 94C. The binaries module 98A and the commercially available Synopsys DesignWare ARChitect tool module 98B data may form a multicore CNN engine IP 99 in some embodiments.

The modules may include hardware circuits, single- or multi-processor circuits, memory circuits, software program modules and objects, firmware, and combinations thereof, as desired by the architect of architecture 50 and as appropriate for particular implementations of various embodiments. The apparatus and systems of various embodiments may be useful in applications other than implementing CNN graph topologies. They are not intended to serve as a complete description of all the elements and features of apparatus and systems that might make use of the structures described herein. Although the inventive concept may include embodiments described in the exemplary context of one or more industry standards, the claims are not intended to be limited by such embodiments.

The accompanying drawings that form a part of the present disclosure show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various claimed inventions is defined only by the appended claims, along with the full range of equivalents to which such claims are entitled.

Although specific embodiments have been illustrated and described herein, any arrangement calculated to achieve the same purpose may be substituted for the specific embodiments shown. This disclosure is intended to include any and all adaptations, combinations or variations of various embodiments disclosed. Accordingly, combinations of the features disclosed with respect to the embodiments disclosed herein, are included in the present disclosure.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Furthermore, the following claims are hereby incorporated into the Detailed Description, with each claim standing on its own as a separate embodiment of the claimed invention.

What is claimed is:

1. A convolutional neural network (CNN) architecture including:
   a) a plurality of processing elements (PEs), each processing element including a plurality of CNN specific processing instructions; and
   b) a streaming data interconnect module, the module including:
      i) a plurality of input ports;
      ii) a plurality of output ports, each coupled to one PE of the plurality of PEs;
      iii) a plurality of first in first out registers (FIFO)s;
      iv) an input streaming interconnect module coupled to the plurality of input ports and the plurality of FIFOs, the input streaming interconnect module capable of changeably directing data from at least one input port of the plurality of input ports to least one FIFO of the plurality of FIFOs based on CNN layer of the plurality of CNN layers being processed by the plurality of PEs; and
      v) an output streaming interconnect module coupled to a plurality of output ports and the plurality of FIFOs, the output streaming interconnect module capable of changeably directing data from at least one FIFO of the plurality of FIFOs to least one output port of the plurality of output ports based on CNN layer of the plurality of CNN layers being processed by the plurality of PEs.

2. The CNN architecture of claim 1, wherein the number of PEs in the plurality of PEs, the number of FIFOs of the plurality of FIFOs is selected during design based on CNN graph topologies to be processed by the CNN architecture.

3. The CNN architecture of claim 2, wherein each FIFOs of the plurality of FIFOs has a depth, and its depth is selected during design based on the CNN graph topologies to be processed by the CNN architecture.

4. The CNN architecture of claim 1, wherein each PE of the plurality of PEs is an application specific instruction processor.

5. The CNN architecture of claim 4, wherein each PE of the plurality of PEs includes a tightly coupled data memory.

6. The CNN architecture of claim 5, wherein each PE of the plurality of PEs includes a tightly coupled program memory.

7. The CNN architecture of claim 4, wherein each PE of the plurality of PEs includes a plurality of pipelines, at least one pipeline for processing CNN specific instructions only.

8. The CNN architecture of claim 4, wherein each PE of the plurality of PEs includes at least 3 pipelines including a general instruction pipeline, a convolution calculating pipeline, and a non-linear activation function pipeline.

9. The CNN architecture of claim 4, wherein each PE of the plurality of PEs includes at least 4 pipelines including a general instruction pipeline, a convolution calculating pipeline, a non-linear activation function pipeline, and a data movement pipeline.

10. The CNN architecture of claim 1, wherein the CNN specific processing functions include convolution functions and non-linear activation functions.

11. The CNN architecture of claim 1, wherein the non-linear activation function employs a look up table function.

12. The CNN architecture of claim 2, wherein the number of FIFOs of the plurality of FIFOs is greater than the number of PEs in the plurality of PEs.

13. The CNN architecture of claim 1, wherein the input streaming interconnect module includes a plurality of demultiplexers individually coupled to one of the plurality of input ports and changeably coupled to a plurality of multiplexers, the plurality of multiplexers individually coupled to one of the plurality of FIFOs.

14. The CNN architecture of claim 13, wherein the output streaming interconnect module includes a plurality of demultiplexers individually coupled to one of the plurality of FIFOs and changeably coupled to a plurality of multiplexers, the plurality of multiplexers individually coupled to one of the plurality of output ports.

15. The CNN architecture of claim 12, wherein the input streaming interconnect module includes a plurality of demultiplexers individually coupled to one of the plurality of input ports and changeably coupled to a plurality of multiplexers, the plurality of multiplexers individually coupled to one of the plurality of FIFOs, the number of demultiplexers of the plurality of demultiplexers less than the number of multiplexers in the plurality of multiplexers.

16. The CNN architecture of claim 15, wherein the output streaming interconnect module includes a plurality of demultiplexers individually coupled to one of the plurality of FIFOs and changeably coupled to a plurality of multiplexers, the plurality of multiplexers individually coupled to one of the plurality of output ports, the number of demultiplexers of the plurality of demultiplexers greater than the number of multiplexers in the plurality of multiplexers.

17. The CNN architecture of claim 1, wherein the CNN architecture is runtime configurable to process different CNN graph topologies.

18. The CNN architecture of claim 17, wherein the input streaming interconnect module is runtime configurable to process the different CNN graph topologies.

19. The CNN architecture of claim 18, wherein the output streaming interconnect module is runtime configurable to process the different CNN graph topologies.

20. The CNN architecture of claim 1, wherein the non-linear activation functions includes one of sigmoid functions and tan h functions.

21. The CNN architecture of claim 2, wherein the number of FIFOs of the plurality of FIFOs is less than the number of PEs in the plurality of PEs.

* * * * *